United States Patent

Gray et al.

[15] 3,639,081
[45] Feb. 1, 1972

[54] LIQUID PRESSURE BOOSTER SYSTEM WITH CUTOFF FOR MINIMUM FLOW LEVELS

[72] Inventors: John Gray, Oak Park; Gene W. Anderson, Downers Grove, both of Ill.

[73] Assignee: Liquitrol Systems, Inc., Brookfield, Ill.

[22] Filed: Jan. 2, 1969

[21] Appl. No.: 788,574

[52] U.S. Cl. .................................. 417/7, 417/12, 417/17, 417/43
[51] Int. Cl. .................................. F04b 41/06, F04b 49/00
[58] Field of Search .................... 103/11, 11 A, 25; 137/392, 137/394; 417/12, 17, 25, 43

[56] References Cited

UNITED STATES PATENTS

| | | | |
|---|---|---|---|
| 2,440,981 | 5/1948 | Smith | 203/25 |
| 2,267,448 | 12/1941 | Dooley | 230/31 |
| 2,458,683 | 1/1949 | Cowherd et al. | 103/25 |
| 2,741,986 | 4/1956 | Smith | 103/11 |
| 2,797,702 | 7/1957 | Martin | 137/392 |
| 3,198,121 | 8/1965 | Schaub | 103/11 |
| 3,294,105 | 12/1966 | Schaub | 103/11 |
| 3,295,450 | 1/1967 | Schonwald | 103/25 |
| 3,322,154 | 5/1967 | Mercier | 138/30 |
| 3,369,489 | 2/1968 | Schaub | 103/11 |

FOREIGN PATENTS OR APPLICATIONS

| | | | |
|---|---|---|---|
| 73,716 | 12/1915 | Germany | 417/6 |

*Primary Examiner*—William L. Freeh
*Attorney*—Dawson, Tilton, Fallon & Lungmus

[57] ABSTRACT

A water pressure booster system includes a plurality of constant-speed pumps which are sequenced according to system demands to maintain the pressure in a discharge conduit at a constant level for all flow rates. Pressure-regulating valves couple the output of each pump to the discharge conduit. To the output of one of the pumps is connected a reservoir of water stored in a collapsible container which is mounted in a tank pressurized with air. Control circuitry sensing both the flow rate in the input conduit and the air pressure in the pressurized tank deenergizes all pumps only when the flow is below a predetermined minimum level and the air pressure within the pressurized tank is above a predetermined level sufficient to maintain the desired discharge or system pressure. This permits all pumps to be deenergized during periods of nonuse, while maintaining the system output pressure at design level. A pump is then turned on only when the tank pressure falls below its preset minimum value. An advantageous construction for the reservoir and tank is also disclosed.

5 Claims, 2 Drawing Figures

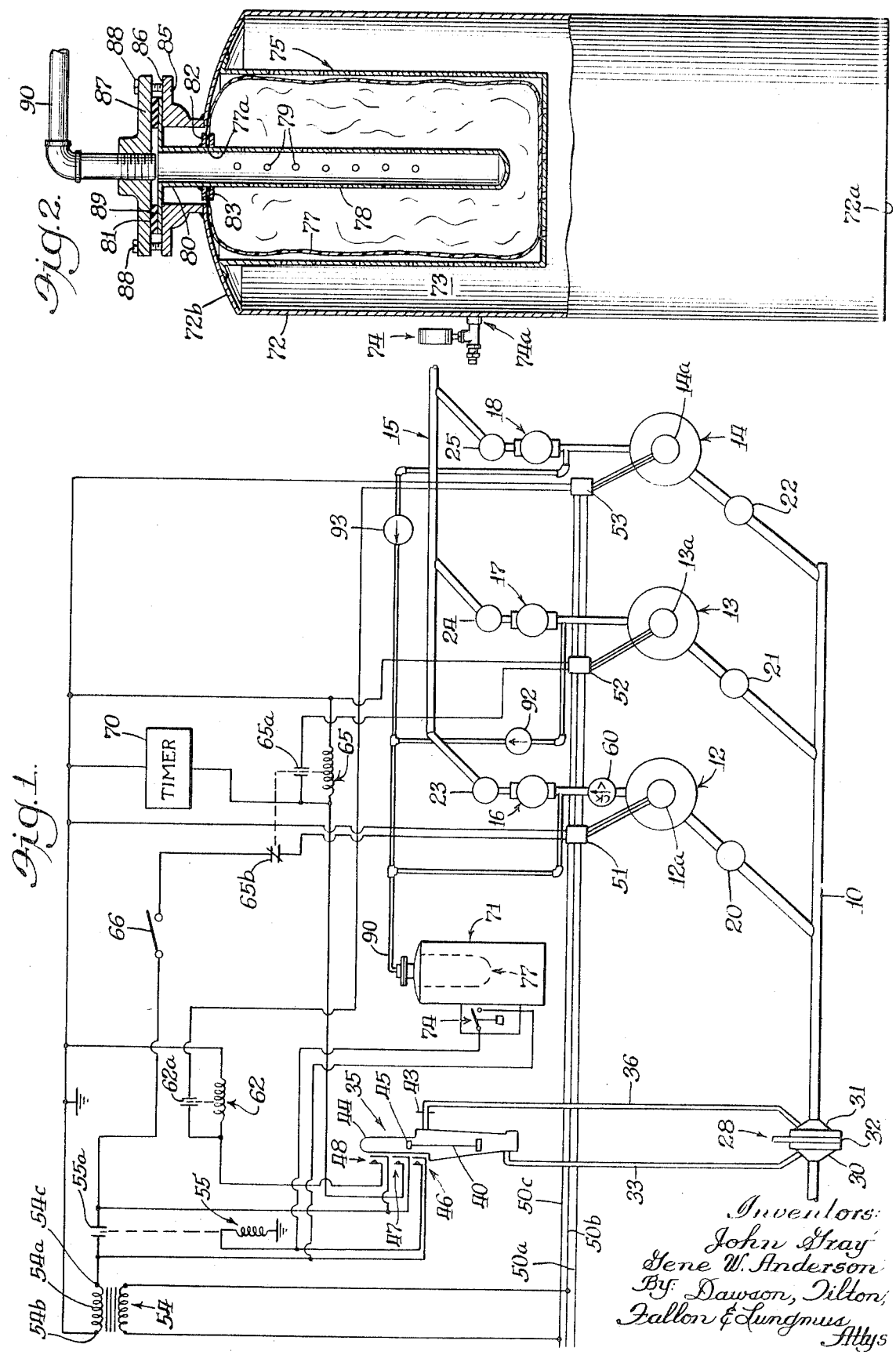

3,639,081

LIQUID PRESSURE BOOSTER SYSTEM WITH CUTOFF FOR MINIMUM FLOW LEVELS

BACKGROUND AND SUMMARY

The present invention relates generally to tankless water pressure booster systems employing constant speed pumps; and more specifically, it relates to water pressure booster systems designed to maintain a constant, higher output pressure for all conditions of flow over a design range.

Water pressure booster systems of the tankless type receive water from a main conduit (without a reservoir) under a normally lower inlet pressure and, by means of a plurality of pumps which are sequenced alone or in parallel, raise the water pressure to the desired level by energizing the pumps according to system flow demands. A pressure-regulating valve interposed between the output of each pump and the system outlet conduit regulates the system output pressure to a predetermined constant level. Because the control systems are much less complex, it is desirable to use constant speed pumps; but persons skilled in the art will appreciate that the invention is not so limited. In this case, however, the individual pumps are either energized or deenergized—their speed is not controlled by varying the input frequency, etc.

Under conditions of minimal or zero flow, these systems are usually designed so that only a lower capacity pump is energized. Even in this case, however, power is wasted by energizing the pump continuously, and the pump experiences wear as long as it is operating.

Studies have shown that many building systems are subject to long periods during which the water flow is zero or very small, for example, schools, office buildings, apartments, process plants, etc., have extended periods under these conditions. Recorded flow charts studied over a number of years indicate patterns of usage wherein apartments have as much as 15 hours a day wherein the flow rate is lower than 10 percent of peak flows. Office buildings may have 12 hours a day wherein the flow is less than 10 percent of the peak flow. Schools may have as much as 17 hours a day of near zero flow. One suggested method for conserving the power and reducing the wear on the pumps is to program the operation of the pumps to turn off at a certain time, for example, during the night periods and on weekends. These systems are restarted each morning. Similar schemes are used to control the operation of air conditioners in office buildings. This type of system, however, produces a wide fluctuation in pressure at start up; and it has the inherent danger of not producing water if needed under emergency conditions during the off period.

Another known system employs control valves which allow the system pressure to rise five p.s.i. above their preset system pressure when the system flow is zero. A switch is set to deenergize the pumps when the system pressure rises to about five p.s.i. above the normal setting of the control valves thus indicating zero flow through the valves. Such swings in output pressure are, of course, undesirable even when the flow is at a minimum.

Still another suggested system uses a tank containing both water and an enclosed volume of air. One of the pump outputs is coupled to the tank upstream of its pressure-regulating valve. A pressure-responsive switch in the tank starts one pump when the pressure is below a predetermined value and stops it when the pressure is above a higher predetermined value, thus requiring a pressure-responsive switch exhibiting a hysteresis characteristic of widely separated pressures. A flow device in the output conduit operates the pump continuously and independently of the pressure switch when the discharge flow exceeds a predetermined level. This system is unsatisfactory in that it causes unnecessary cycling of the first pump. For example, under conditions of minimal use, if a flush valve is actuated, the flow may exceed the low preset value, yet the tank pressure and capacity would be sufficient to supply the demand without energizing the pump. In addition to the consumption of power by turning on and running the pump, the repeated cycling of the constant speed pumps causes excess wear. The present invention overcomes these disadvantages; and it does not require a pressure-responsive switch having a hysteresis characteristic (i.e., closing at a lower settable pressure and opening at a higher settable pressure).

In the present system, the pressure in the output or discharge conduit is maintained at a constant level for all values of flow by pressure-regulating valves which are interposed between the output of each of a plurality of pumps and the system output conduit. The input of each of the pumps is coupled to an input conduit of a tankless pumping system.

A check valve is inserted in the output conduit of the lowest-capacity pump; and a pressurized reservoir of water is coupled to the output of the first pump downstream of the check valve and upstream of the pressure-regulating valve. The outputs of the other pumps are also connected to the tank via conduits provided with check valves. A pressure-responsive switch senses the pressure in the reservoir and generates a signal when it falls below a preset level which is slightly above the desired constant system output pressure.

In a preferred embodiment, the pressurized reservoir includes a collapsible plastic container for the water which is replaceably mounted in a precharged tank (that is, the tank is filled with a pressurized gas such as air). Thus, the water cannot cause corrosion of the interior of the tank; and the water is always separated from the air to eliminate absorption of the air by the water.

If the flow is below the minimum value and the pressure in the precharged tank is above its preset level, then the control circuitry for sequencing the pumps is deenergized; and the driving motors of all of the pumps are disconnected. Thus, under conditions of minimum flow, the constant speed pumps are deenergized, while at the same time, the system output pressure is not diminished.

Thus, control circuitry deenergizes all of the pumps only when the flow is below a predetermined low level and the pressure in the tank is above the predetermined value above the desired system pressure. Time delay mechanism continues to energize the pump that is running even after this condition exists to increase the capacity of the reservoir. A flow meter senses the flow in the input conduit to sequence the pumps in predetermined order in response to the demand as seen at the suction side of the pump. Thus, if the pumps are off and demand is being supplied only by the tank, no pumps will be turned on until the pressure in the tank falls below a preset level above the desired constant discharge pressure. In other words, under minimal flow conditions when the pumps are shut off, the sequencing-on of the first pump is determined only by the pressure level of the water in the tank; and it is independent of the discharge flow rate.

Time delay mechanism is provided for deenergizing a higher capacity pump so that once it is started, it will run for a predetermined time after the flow level has reduced to the point where it deenergizes the circuitry that started this pump. Since the higher-capacity pump has a higher shutoff pressure than do the lower-capacity pumps, this feature permits charging the reservoir tank to a higher pressure before the pump stops. Under some conditions, the lowest-capacity pump will be bypassed when the system is being sequenced off—thus resulting in an extended off time for the pumps since the reservoir has been charged to a higher pressure and greater capacity.

Another important feature of the present invention is its inherent ability to take advantage of increases in input pressure above design minimum. It will be appreciated that the pressure in the inlet header may vary appreciably. However, in the last of the above-mentioned prior systems, a first pump is energized if the tank pressure falls to a preset low level and the pump is deenergized when the tank pressure reaches a preset higher level. This scheme cannot take advantage of increases in suction pressure because the pump is always shut off at a constant pressure. Use of a differential pressure switch, however, would permit such a system to charge the tank to a higher pressure.

In the instant system, the pump is energized to charge the tank when the tank pressure falls to a predetermined level above the desired system pressure; and once energized, the pump charging the tank will run for a predetermined time after the tank pressure has returned to its preset level. Thus, if the suction pressure increases, the pump, by virtue of its design capacity, will take advantage of this increase and charge the tank to a higher pressure and greater capacity by being left on for a minimum predetermined time.

As disclosed more fully within, the novel construction of the precharged tank permits convenient access to the collapsible water bag which becomes, in effect, a cartridge which is easily replaced or repaired if ruptured or in the course of regular maintenance. A retainer cage prevents expansion of the bag beyond its safe limits; and an apertured tube within the bag prevents choking off of the bag's discharge throat during the discharge of water.

Other features and advantages of the present invention will be explained from the following detailed description accompanied by the attached drawing which illustrates a preferred embodiment of the invention.

THE DRAWING

FIG. 1 is a combined circuit and system schematic diagram of a control system according to the present invention; and FIG. 2 is a partially cutaway side elevational view of a reservoir tank incorporated in the system of FIG. 1.

DETAILED DESCRIPTION

Turning now to FIG. 1, there is seen in diagrammatic form, a system which incorporates the present inventive concept. An inlet conduit or header 10 is coupled to a source of pressurized water (not shown). Three pumps indicated respectively by reference numerals 12, 13 and 14 receive water from the header 10. All of the pumps 12–14 are connected for parallel operation when energized; and the output of each of the pumps 12–14 is fed to an output or system conduit 15. Pressure-regulating valves, generally designated 16, 17 and 18 respectively, are interposed between the output of the pumps 12–14 and the system conduit 15 to maintain a desired system pressure.

Any number of pumps as well as any combination of different capacities may be used in accordance with the present invention; however, for clarity of understanding, a specific example will be presented. Let it be assumed that the pumps 12, 13 and 14 have capacities which are respectively 25 percent, 55 percent, and 55 percent of the design system output capacity. Thus, although other combinations may be easily employed, the illustrated system contemplates that pump 12 will operate up to 25 percent of system capacity, thereafter pump 13 will be energized and pump 12 deenergized. Above 55 percent of system capacity, pumps 13 and 14 will operate in parallel and simultaneously whereas pump 12 will remain deenergized.

The function of each of the pressure-regulating valves 16–18 is to effect a pressure drop from the discharge pressure of its associated pump to maintain the pressure in the outlet conduit 15 at a constant, uniform level. Each of the pressure-regulating valves 16–18 conducts the flow of water only unidirectionally—that is, in addition to regulating the outward pressure, the valves 16–18 act as check valves. Such pressure-regulating valves are common in the art.

Each of the pumps 12–14 is a constant speed pump—that is, once energized, motors 12a–14a powering the pumps 12–14 drive them at constant speed. As has already been mentioned, it is highly desirable from the point of view of simplifying the control equipment to employ constant speed pumps in pressure booster systems.

Gate valves 20, 21 and 22 are interposed in the inlet conduits of the respective pumps 12, 13 and 14. Similarly, gate valves 23, 24 and 25 are interposed in the outlet conduits of each of the pumps 12–14 for shutting them down individually, if desired, without interrupting the system operation.

Flow-measuring means, generally designated by reference numeral 28, is incorporated in the inlet header 10 for generating electrical signals representative of discrete levels of flow, which signals control the operation of the pumps as described within. The flow-measuring means 28 includes an upstream tapped orifice flange 30 and a similar orifice flange 31 located downstream thereof. A straight-edge orifice plate 32 is supported between the flanges 30 and 31. A conduit 33 is connected to the tapped orifice flange 30 and coupled to the bottom connection of a rotameter generally designated 35. A return conduit 36 couples water passing through the rotameter 35 back to the flow-measuring means 28 via the tapped orifice flange 31. An indicator stem 40 located within the rotameter 35 is adapted for vertical movement as a function of waterflow through the rotameter. The vertical displacement of the indicator stem 40 from a reference point is proportional to the pressure differential across the main orifice plate 32 and a bypass orifice 43 located in the return conduit 36. Thus, the vertical location of the indicator stem 40 is representative of flow through the rotameter and, hence, through the inlet header 10.

The rotameter 35 includes an upper wet well 44 which is nonmagnetic. A cap 45 secured to the top of the indicator stem 40 is magnetic, however. Magnetically actuated reed switches 46, 47 and 48 are positioned at spaced vertical locations adjacent the nonmagnetic wet well 44 to be actuated by the magnetic head 45 of the indicator stem 40 at different flow levels. The reed switch 46 is ordinarily set at a low flow rate, for example, 5–10 percent of system design level. If the system flow is below the level which energizes the switch 46, the system permits deenergizing of all of the pumps provided that the pressure in the reservoir tank is above a predetermined level (above the desired system discharge pressure) which indicates that a sufficient pressure exists at the output of the lowest-capacity pump. This will be clear after entire system has been fully understood, the attempt here being to appreciate the function of the reed switches.

The switches 47 and 48 control the sequencing of pumps 13 and 14 respectively. The switch 47 is actuated or closed when the flow level reaches 25 percent of design maximum. Similarly, for the example given, the switch 48 is set to close when the flow level reaches 55 percent of system maximum.

Three power lines 50a, 50b and 50c receive electrical energy from a conventional three-phase source (not shown) and couple it to starter boxes 51, 52 and 53 which energize the motors 12a, 13a and 14a respectively.

A transformer generally designated 54 has its primary winding receiving energy from the powerlines 50b and 50c; and its secondary winding 54a provides power for energizing the control circuitry. One terminal of the transformer secondary 54a, for example the terminal 54b, may be considered to be a grounded or common terminal; and the second terminal 54c may be considered as the "hot" terminal.

The previously mentioned switch 46 which is actuated by the rotameter 35 has one contact connected to the terminal 54c of secondary winding 54a, and its second terminal connected to the coil of a relay 55, the other terminal of which is grounded. The relay 55 actuates normally open contacts 55a which are connected in series with the terminal 54c. Preferably the relay closes contacts 55a immediately upon being energized, but delays the opening of these contacts for a predetermined (but adjustable) time for reasons explained within. The second reed switch 47 controlled by the rotameter 35 has one terminal connected to the contacts 55a; and the other terminal of switch 47 is connected to a coil of a relay generally designated by reference numeral 65. The relay 65 actuates normally open contacts 65a to couple power to the starter box 52 to start the motor 13a when the flow level in the input header reaches the 25 percent of design capacity level. The relay 65 actuates normally closed contacts 65b to deenergize motor 12a for a predetermined time after the contacts 65a close to permit the second pump to reach full speed before shutting off the first.

The switch 48 of the rotameter 35 also has one of its terminals connected to the contacts 55a of relay 55. The other terminal of the switch 48 is connected in series with the coil of a relay 62, the other side of which is grounded. The relay 62 actuates normally open contacts 62a to couple energy from the switch 48 to energize the starter box 53 which energizes the motor 14a when the flow level in the input header reaches the 55 percent level so that pumps 13 and 14 will operate simultaneously. A timer 70 is energized simultaneously with relay 65 and keeps the relay 65 energized for a predetermined time after the rotameter switch 47 has opened. Thus, if pump 13 is operating and flow conditions fall below the 25 percent level, pump 13 will continue to operate until the time 70 times out.

A sealed tank 71 includes a cylindrical jacket or wall 72 (see FIG. 2). The wall 72 defines the sides of a chamber 73 which contains a volume of pressurized air. A pressure-sensitive switch 74 communicates with the chamber 73 via connection 74a. When the pressure of the air in chamber 73 falls to a predetermined value, the switch 74 (shown schematically in FIG. 1) closes. When the air pressure rises to the same level, the switch opens again.

Referring again to the electrical diagram of FIG. 1, the switch 74 has one terminal directly connected to the terminal 54c of the secondary winding 54a, and its other terminal directly connected to the coil of relay 55. That is, the pressure-sensitive switch 74 is electrically connected in parallel with the reed switch 46 of the rotameter 35.

When one or more of the pumps is supplying the demand and the demand reduces to a minimal or near-zero level, the flow through the rotameter 35 will correspondingly diminish thus opening contacts 46. If, at the same time, the pressure in the tank 71 (which is the same as the pressure at the upstream end of pressure-regulating valve 16) is higher than the preset level which actuates the pressure-sensitive switch 74, then relay 55 will be deenergized. However, since there is a time delay between deenergizing relay 55 and the opening of contacts 55a, one of the pumps will continue to operate to charge the tank 71 to a higher pressure and capacity.

Once the pumps have all been shut down, the input conduit and rotameter are isolated from the system demand by the deenergized pumps; and the operation of the pumps becomes independent of flow thus obviating the above-defined problem of some prior systems. The only time the pumps can be energized again is when the tank pressure falls to a point where switch 74 closes.

It will now be appreciated that the instant system inherently takes advantage of increases in suction pressure above design minimum without the use of expensive differential pressure switches since the delay off of relay 55 permits the then operating pump to charge the tank to a higher pressure if the suction pressure is above design minimum. That is, the tank pressure depends upon the sum of the suction pressure and the pressure generated by the operating pump. This time delay feature also obviates the need of employing a pressure-sensitive switch (as called for in some known systems) which closes at one pressure level and opens at a second, higher level.

Turning again to FIG. 2, a curved upper dish 72b is formed integrally with the cylindrical sidewall 72 and bottom 72a to provide the airtight chamber 73 for storing the pressurized air. Located within the chamber 73 and suspended from the dish 72b is an apertured or perforated cage 75 which includes a cylindrical sidewall and a perforated bottom; and its permits the passage of air from the chamber 73 to the interior of the cage. Suspended within the cage 75 is a flexible or collapsible plastic bag 77. When fully expanded, the bag 77 conforms to the interior of the cage 75 and is confined against further expansion by the cage to prevent rupture of the bag. A perforated restrainer tube 78 extends downwardly within the bag 77; and it is provided with apertures along the portion of its length within the bag 77 (as at 79) to permit the ingress and egress of water in the bag 77 while preventing collapse of the bag at its throat 77a to choke off water as the bag contracts.

As mentioned, the apertures 79 of the restrainer tube 78 are located only on that portion which lies interior of the bag 77; and the restrainer tube 78 is provided with a solid neck portion 80 which extends above the dish 72b and which terminates in an upper securing flange 81. A second lower flange 82 is welded about the periphery of the restrainer tube 78 at the base of the neck 80; and the bag 77 is held in place by securing its throat 77a between the flange 82 and a similar flange 83 which is bolted to the flange 82. A lower mounting seat member 85 is welded to the top of dish 72b; and it defines a flat shoulder 86 on which the upper flange 81 of the restrainer tube 78 rests. There is, of course, a gasket between the two to prevent the escape of air. An upper seat member 87 is secured by means of bolts 88 to the lower seat member 85 to secure the restrainer tube 78 in place. A gasket 89 seals the upper flange 81 of the restrainer tube with the member 87 to prevent the escape of the pressurized water. An output conduit 90 communicates with the interior of the bag 77 via the apertures 79 in the restrainer tube 78.

As seen schematically in FIG. 1, the output conduit 90 of the reservoir tank 71 is coupled directly to the output conduit of the pump 12 at a location downstream of the check valve 60. This check valve is to isolate the pump output from the pressurized tank when the pump is shut off; and it may not be necessary if the pump discharge design does this. Similarly, the output conduit 90 is coupled to the output of the pump 13 via a check valve 92 which permits a unidirectional flow of water from the pump 13 into the flexible bag 77. Since the only flow of water through the check valve 92 is to fill the bag 77, the conduit associated with the check valve 92 may be substantially smaller than the conduit which couples the output of the tank 71 to the output of pump 12. That is, the tank 71 will always discharge through the pressure-regulating valve 16 into the system so this is the only conduit that need be large. In similar fashion, the output conduit 90 communicates with the output of the pump 14 via a check valve 93 which permits the unidirectional flow of water from the pump 14 to fill the bag 77.

OPERATION

In operation, prior to turning the system on, normally the pressure in the discharge conduit 15 will be at below its design level; and the contents of the bag 77 will have been at least partially exhausted through the pressure-regulating valve 16 into the system. Thus, the pressure-sensitive switch 74 sensing the air pressure within the chamber 73 will normally be closed. This will energize the relay 55 to close the contacts 55a. Hence, when the system on/off switch 66 is closed, power will be coupled directly from the terminal 54c of the secondary winding 54a through the closed contacts 55a, the switch 66, and the normally closed contacts 65b to the starter box 51. When the starter box 51 is energized, it will couple the three-phase source to the motor 12a which drives pump 12.

Pump 12 will supply the system demand via the pressure-regulating valve 16 (while filling the bag 77 via the conduit 90) up to 25 percent of the system capacity. At this higher flow level, the switch 47 will close, and power will be fed to energize the coil of relay 65 and timer 70. Power will then be coupled through the closed contacts 65a to a stater box 52 to energize motor 13a. Relay 65 will also actuate normally closed contacts 65b to deenergize motor 12a; however, the actuation of the contacts 65b preferably is delayed for a sufficient time to allow the motor 13a to achieve full speed prior to deenergize motor 12a, as mentioned.

Should the flow requirement reach 55 percent of the system design capacity, the switch 48 of the rotameter 35 will close. It will be observed that the switch 46 mans closed for all flow levels above a minimum level so that the relay 55 will remain energized. This, in turn, energizes the coil of relay 62 and couples power via the normally open contacts 62a to the starter box 53 to energize the motor 14a which drives pump 14 in parallel with the previously energized pump 13 to supply system demands.

If now, the system requirements are reduced, first the switch 48 of the rotameter 35 opens to deenergize relay 62 and open contacts 62a. This deenergizes the motor 14a. Upon even further reduction of flow, the switch 47 opens to deenergize motor 13a. However, the relay 65 is held energized by timer 70 for a predetermined time. This provides an important feature of the present invention in combination with conduit that couples the output of pump 13 to the tank because it permits the higher capacity pump 13 to charge the reservoir tank to a higher pressure than the lower capacity pump is capable; and it permits pump 12 to be bypassed completely under certain conditions. For example, if system requirements dropped abruptly from 40 percent to a minimal flow condition, pump 13 would charge the reservoir and timer 70 would hold relay 65 energized. Hence, pump 12 will not be started since contacts 65b will be open. Relay 55 will open contacts 55a (after a delay) and then timer 70 will time out to shut pump 13 down without energizing pump 12.

Persons skilled in the art will appreciate that one of the major advantages of the present invention is that it permits the use of constant speed pumps in a water pressure booster system while at the same time, permitting all the pumps to be deenergized during periods of minimum flow. Thus, the sequencing of the pumps for meeting system demands may be accomplished by means alternative to those which have been illustrated, such as a pressure switch sensing a drop in the output conduit, means sensing the pressure differential across a straight edge orifice connected to a rotameter in the output conduit, means sensing the velocity changes of a liquid in a system, a pitot tube or a paddle switch, means sensing the modulation of a valve stem on a pressure control valve, means sensing power load changes, combinations of the aforementioned means, etc.

Having thus described in detail, a preferred embodiment of the inventive system together with certain modifications thereof, it will be apparent to persons skilled in the art that other modifications may be made and that equivalent structure substituted for that which has been disclosed without departing from the inventive principle; and it is, therefore, intended that all such modifications and equivalents be covered as they are embraced within the spirit of the invention.

We claim:

1. In combination with liquid pressure booster system having a plurality of pumps receiving said liquid from a source and selectively energized to force the same to a higher pressure, and pressure-regulating means receiving the output of a first of said pumps and feeding the same to an output conduit at constant discharge pressure, the improvement comprising reservoir means storing said liquid under pressure and communicating said liquid with the input of said pressure-regulating means, said reservoir means including a collapsible, flexible plastic bag containing said liquid and further including means communicating the interior of said bag with the output of said first pump, a perforated cage enclosing said bag for limiting the expansion thereof means for pressurizing the environment around said bag, an elongated, perforated tube within said bag and permitting liquid within said bag to exhaust through said tube when said bag collapses, said tube preventing choking of the exhaust passage as the bag collapses; flow-responsive means sensing the flow of said liquid in said system for sequencing said pumps in predetermined order; pressure-sensitive means responsive to the pressure in said reservoir for generating a pressure signal when said pressure is at least as great as a preset level; shutoff means responsive to said flow signal and said pressure signal for deenergizing said pumps means when said flow is less than a predetermined level and said pressure is at least as great as said preset level, said flow-responsive means and said pressure-sensitive means connected in said system such that when said pumps are off only said pressure-sensitive means is operatively connected to energize said first pump and said flow-responsive means is rendered insensitive to flow in the discharge conduit; whereby said first pump may be deenergized during periods of minimum flow as long as said tank pressure is maintained at least as great as said preset level and the energizing of said first pump is determined only by the pressure in said tank.

2. The system of claim 1 wherein said bag defines a discharge throat receiving said tube, and further comprising a first peripheral flange mounted on said tube, a second flange securable to said first flange, said first and second flanges cooperating to clamp and seal the throat of said bag thereto, and means communicating the top of said tube exterior of said bag with the output of said first pump.

3. In a tankless pumping system having at least a first pump and a second pump and control means including flow-responsive means for sequencing the operation of said pumps to force a liquid from an input header to a discharge conduit at a higher pressure through pressure-regulating means to maintain a constant pressure in said discharge conduit, the combination comprising a tank enclosing a volume of air and a volume of water under pressure, first conduit means communicating said water in said tank with the output of both of said pumps, pressure means sensing the pressure in said tank for energizing one of said pumps when said tank pressure falls below a preset level, switching means for deenergizing an operating pump a predetermined time after said pressure level in said tank reaches said preset level provided the flow through said pumps is below a predetermined low level and connections for rendering said flow-responsive means inoperative to energize any pump when all of said pumps have been shut down.

4. The combination of claim 3 further comprising second conduit means coupling the output of said second pump to said water volume in said tank, control means for energizing said second pump when the flow level exceeds a second preset flow level and including timer means for deenergizing said second pump only after said flow has fallen and remained below said second preset flow level for a predetermined time whereby when said flow reduces from a level above said second preset level to a level below said preset low level, said second pump remains energized to charge said tank to a higher pressure and greater capacity and said first pump is bypassed during shut down.

5. In combination with a liquid pressure booster system having a plurality of pumps receiving said liquid from a source and selectively energized to force the same to a higher pressure, and pressure-regulating means receiving the output of a first of said pumps and feeding the same to an output conduit at constant discharge pressure, the improvement comprising reservoir means storing said liquid under pressure and communicating said liquid with the input of said pressure-regulating means, flow-responsive means sensing the flow of said liquid in said system for sequencing said pumps in predetermined order; pressure-sensitive means responsive to the pressure in said reservoir for generating a pressure signal when said pressure is at least as great as a preset level, shutoff means responsive to said flow signal and said pressure signal for deenergizing said pumps means when said flow is less than a predetermined level and said pressure is at least as great as said preset level, said flow-responsive means and said pressure-sensitive means connected in said system such that when said pumps are off only said pressure-sensitive means is operatively connected to energize said first pump and said flow-responsive means is rendered insensitive to flow in the discharge conduit; whereby said first pump may be deenergized during periods of minimum flow as long as said tank pressure is maintained at least as great as said preset level and the energizing of said first pump is determined only by the pressure in said tank; unidirectional valve means coupling the outlet of all of said pumps to said reservoir; and means communicating the outlet of said reservoir with at least one pressure-regulating valve feeding the discharge conduit whereby any of said pumps which is running may charge the reservoir.

* * * * *